(12) United States Patent
Choochotkaew et al.

(10) Patent No.: US 11,792,289 B2
(45) Date of Patent: Oct. 17, 2023

(54) LIVE SOCKET REDIRECTION (71) Applicant: INTERNATIONAL BUSINESS MACHINES CORPORATION, Armonk, NY (US)

(72) Inventors: Sunyanan Choochotkaew, Koto (JP); Tatsuhiro Chiba, Bunkyo-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/532,579

(22) Filed: Nov. 22, 2021

(65) Prior Publication Data
US 2023/0164235 A1 May 25, 2023

(51) Int. Cl.
*H04L 67/563* (2022.01)
*H04L 49/20* (2022.01)
*H04L 43/08* (2022.01)
*H04L 49/90* (2022.01)
*H04L 49/00* (2022.01)

(52) U.S. Cl.
CPC .......... *H04L 67/563* (2022.05); *H04L 43/08* (2013.01); *H04L 49/205* (2013.01); *H04L 49/3027* (2013.01); *H04L 49/9063* (2013.01)

(58) Field of Classification Search
CPC ..... H04L 67/563; H04L 43/08; H04L 49/205; H04L 49/3027; H04L 49/9063
USPC ................................................. 709/225, 226
See application file for complete search history.

(56) References Cited

U.S. PATENT DOCUMENTS

| | | | | |
|---|---|---|---|---|
| 6,546,425 B1* | 4/2003 | Hanson | ................... | H04L 1/188 709/227 |
| 6,785,704 B1* | 8/2004 | McCanne | ............. | H04L 67/101 709/239 |
| 10,003,536 B2* | 6/2018 | Raileanu | ............... | H04L 47/122 |
| 10,037,689 B2* | 7/2018 | Taylor | .................. | G05D 1/0285 |
| 10,943,271 B2* | 3/2021 | Miller | ................ | G06Q 30/0267 |
| 2006/0092933 A1* | 5/2006 | Astley | ................... | H04L 67/563 370/389 |
| 2008/0222734 A1* | 9/2008 | Redlich | ................. | H04L 9/3271 726/26 |
| 2013/0086280 A1* | 4/2013 | James | .................... | H04L 45/10 709/238 |

(Continued)

FOREIGN PATENT DOCUMENTS

CN 104951375 A 9/2015

OTHER PUBLICATIONS

Mell et al., "The NIST Definition of Cloud Computing", National Institute of Standards and Technology, Special Publication 800-145. Sep. 2011, pp. 1-7.

(Continued)

*Primary Examiner* — Thu Ha T Nguyen
(74) *Attorney, Agent, or Firm* — Tutunjian & Bitetto, P.C.; Randy Emilio Tejeda (57) ABSTRACT

Networking methods and systems include determining a first state of a connection on a first network based on connection buffers at a host. A first system call relating to the connection is identified. A next state of the connection that would result from the first system call is determined. The first system call is executed responsive to a determination that the next state does not move the connection farther from a safe transition state.

18 Claims, 6 Drawing Sheets

(56) References Cited

U.S. PATENT DOCUMENTS

| | | | |
|---|---|---|---|
| 2014/0108665 A1* | 4/2014 | Arora | H04L 67/563 709/227 |
| 2014/0280316 A1* | 9/2014 | Ganick | G06F 16/2457 707/769 |
| 2015/0143504 A1 | 5/2015 | Desai et al. | |
| 2016/0182380 A1* | 6/2016 | Mehra | H04L 47/125 709/226 |
| 2017/0070387 A1* | 3/2017 | Rao | H04L 41/40 |
| 2017/0085459 A1* | 3/2017 | Xia | H04L 43/0876 |
| 2018/0007178 A1 | 1/2018 | Subhraveti | |
| 2018/0241669 A1* | 8/2018 | Muscariello | H04L 61/2503 |
| 2019/0245779 A1* | 8/2019 | Jonnalagadda | H04L 45/22 |
| 2019/0286469 A1* | 9/2019 | Lakshmikantha | H04L 45/036 |
| 2019/0312979 A1* | 10/2019 | Sharma | H04M 15/8221 |
| 2019/0342417 A1* | 11/2019 | Gerdfeldter | H04L 67/563 |
| 2021/0099384 A1* | 4/2021 | Hyun | H04L 67/141 |
| 2021/0234898 A1* | 7/2021 | Desai | H04L 63/104 |
| 2021/0400060 A1* | 12/2021 | Chacko | H04L 63/20 |
| 2022/0041194 A1* | 2/2022 | Lidgett | B61L 27/57 |
| 2022/0060557 A1* | 2/2022 | Bathla | H04L 63/20 |
| 2022/0141685 A1* | 5/2022 | Ergen | H04L 45/245 370/252 |
| 2022/0224638 A1* | 7/2022 | Vadde Makkalla | H04L 45/74 |
| 2022/0360663 A1* | 11/2022 | Kempson | H04M 3/42306 |
| 2023/0052452 A1* | 2/2023 | Choochotkaew | G06F 21/53 |
| 2023/0164235 A1* | 5/2023 | Choochotkaew | H04L 49/3027 709/226 |
| 2023/0206329 A1* | 6/2023 | Cella | G06Q 20/405 705/37 |
| 2023/0224377 A1* | 7/2023 | Bathla | G06F 21/552 726/22 |

OTHER PUBLICATIONS

Niu, Zhixiong, et al. "NetKernel: Making Network Stack Part of the Virtualized Infrastructure", arXiv:1903.07119v2 [cs.NI]. Mar. 19, 2019, pp. 1-17.

* cited by examiner

FIG. 8 ical networks. While redirecting overlay sockets to host sockets may help improve performance on overlay networks, a process may hang waiting for buffers to clear so that the redirection may be performed safely.

LIVE SOCKET REDIRECTION

BACKGROUND

The present invention generally relates to networking in decentralized computing systems, and, more particularly, to redirecting overlay sockets to host sockets in a containerized architecture.

Platform as a Service (PaaS) systems provide rapidly provisioned computing solutions for diverse workloads on an as-needed basis. Such PaaS systems may have a set of different processing nodes, each of which can be provisioned with a different set of images or "containers" that provide the software needed for workload execution. The PaaS systems may also include a registry system that stores, distributes, and manages those images, sending the images to processing nodes when requested.

Different layers of networking are available to containerized systems, including host-level networks and overlay networks. While redirecting overlay sockets to host sockets may help improve performance on overlay networks, a process may hang waiting for buffers to clear so that the redirection may be performed safely.

SUMMARY

A networking method includes determining a first state of a connection on a first network based on connection buffers at a host. A first system call relating to the connection is identified. A next state of the connection that would result from the first system call is determined. The first system call is executed responsive to a determination that the next state does not move the connection farther from a safe transition state.

A networking system includes a hardware processor and a memory that stores a computer program. When executed by the hardware processor, the computer program causes the hardware processor to determine a first state of a connection on a first network based on connection buffers at a host, to identify a first system call relating to the connection, to determine a next state of the connection that would result from the first system call, and to execute the first system call responsive to a determination that the next state does not move the connection farther from a safe transition state.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

To perform redirection of a connection from an overlay socket to a host socket, sets of rules are described herein for determining that a buffer state is safe for performing the redirection. States at a server end of the connection and at a client end of the connection may be synchronized before performing the redirection. Thus, a safe buffer state may be ensured, so that no data loss occurs, without waiting for the buffer to empty on its own.

Port redirection may be performed using the dup2 function, which may be an operating system level system call that duplicates file descriptors. This can be used to redirect a connection from an overlay network socket to a host socket by closing the overlay socket, originally linked to a target descriptor, and duplicating a host socket and place to the target descriptor. The dup2 call should be called from a controlled process namespace by intercepting dup2 to the target processes when detecting the overlay connection.

However, when socket redirection is performed, it does not stop the target process at an establishment state. As such, socket redirection is often performed during the communication state, for example using ptrace call interception, which makes it possible to trap and block processes and then access registers and read/write data of process memory. However, a challenge in this approach is that the target process can hang or be terminated if the socket is closed with data left in the buffer. In network-intensive applications, the buffer is rarely empty, especially at both ends of the connection at the same time. The rule sets described herein ensure that redirection can be performed safely.

Figure 1:
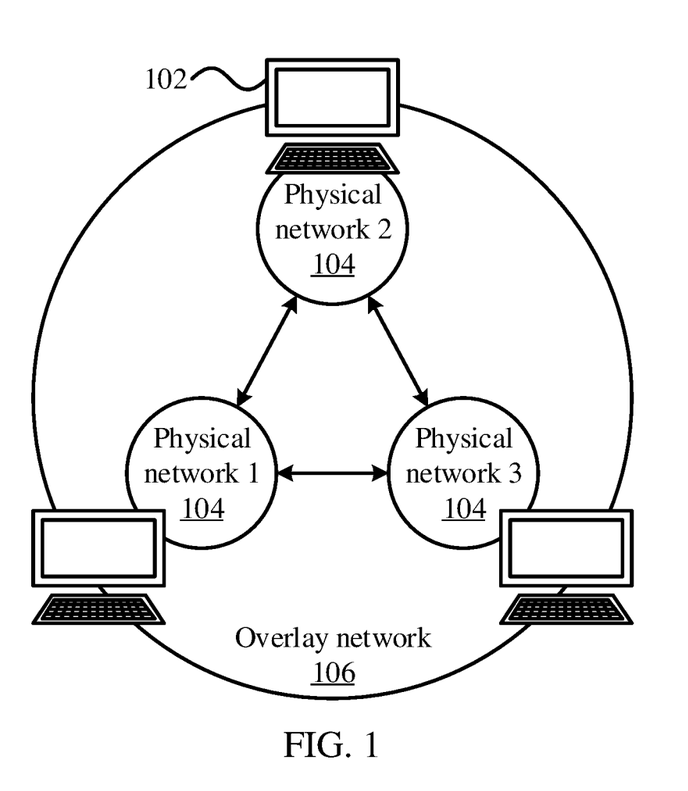
FIG. 1 is a diagram of a distributed computing system that includes an overlay network and a host-level network and that can transition connections from the overlay network to the host-level network, in accordance with an embodiment of the present invention.

Referring now to FIG. 1, a diagram illustrates the relationship between a host network and an overlay network. In a containerized, decentralized computing system, it may be beneficial to have distinct hosts 102 that all participate in the system, but that are running on distinct physical networks 104. These physical networks 104 may communicate with one another, for example via the internet.

However, there may be advantages to running the hosts 102 as if they were all on the same local network. For example, communications between the hosts 102 may be more easily secured via a private network than if those communications were sent in the clear over the internet. One solution to this is to create an overlay network 106. The hosts 102 can communicate with each other via the overlay network as if they were on the same local physical network.

Virtualization software at the host translates overlay network communications into host network communications, which can then be transmitted over the physical networks 104, but for example with end-to-end encryption.

Each of the hosts 102 sees two different network interfaces. A first, host-level interface communicates with other hosts on the physical network 104 or with other devices on the internet. A second, overlay interface communicates with other hosts that are on the overlay network 106. In some cases, a connection between hosts 102 may need to be transferred from the overlay network 106 to the host-level network.

In principle, there is nothing stopping this from happening. In many cases, the host-level interface and the overlay interface use the same communications hardware within the host 102 to communicate on their respective networks. However, as noted above, it can be difficult to ensure that the communications buffers are empty before making the switch. As described herein, the hosts 102 may test the connection to determine whether it is safe to transition the connection from the overlay network 106 to the host-level network. At that point, the host 102 making the transition may duplicate the connection's file descriptor.

The host 102 may have a buffer associated with the connection, which may store information that is to be transmitted, but which has to wait for the network interface to be available. The buffer may be in one of several different states, for example including a ZERO state, a ZERO_READ state, a ZERO_WRITE state, a READ_WRITE state, and an UNKNOWN state. When the host buffers at each end of the connection have a ZERO state, socket redirection may be performed, for example using the dup2 system call. If the buffer is in another state, then the host 102 takes actions to move the buffer toward the ZERO state, as described in greater detail below, for example by blocking or continuing operations as needed.

Whereas a naïve approach might be to block all operations and wait for the buffer to clear, or to use a read-write aware approach, these approaches may lead to an infinite blocking state, whereby the connection may never reach a safe state for the transition. In contrast, the state-aware rules described herein avoid locking.

Figure 2:
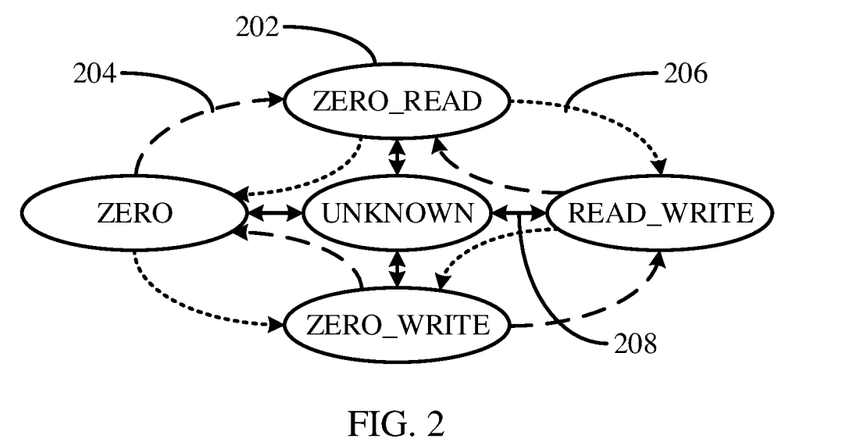
FIG. 2 is a state diagram that illustrates possible connection states and actions that can move the connection from one state to another, in accordance with an embodiment of the present invention.

Referring now to FIG. 2, a state diagram is shown that illustrates different buffer states 202 at a host 102 and the state transitions that may occur. As noted above, the buffer states 202 may include ZERO (indicating empty buffers on both sides of the connection), ZERO_READ (indicating an empty incoming buffer and an outgoing buffer with data in it), ZERO_WRITE (indicating an empty outgoing buffer and an incoming buffer with data in it), READ_WRITE (indicating an incoming buffer with data and an outgoing buffer with data), and UNKNOWN.

Transitions that may occur are shown in terms of which host 102 performs them, with dashed lines 204 representing actions performed by the local host 102 and with dotted lines 206 being performed by the remote host 102. These actions may include read actions and write actions. Thus, if the connection is in a ZERO state, a write action by the local host 102 will put the connection into the ZERO_READ state. These state transitions are described in Table 1 below. Notably, any state may lead to or from an UNKNOWN state by an action that may include wait, return, detach, or attach.

TABLE 1

| Current state | Action | Destination state |
|---|---|---|
| ZERO | Local write | ZERO_READ |
| ZERO | Remote write | ZERO_WRITE |
| ZERO | Wait/return/detach/attach | UNKNOWN |
| ZERO_READ | Remote read | ZERO |
| ZERO_READ | Remote write | READ_WRITE |
| ZERO_READ | Wait/return/detach/attach | UNKNOWN |
| ZERO_WRITE | Local read | ZERO |
| ZERO_WRITE | Local write | READ_WRITE |
| ZERO_WRITE | Wait/return/detach/attach | UNKNOWN |
| READ_WRITE | Local read | ZERO_READ |
| READ_WRITE | Remote read | ZERO_WRITE |
| READ_WRITE | Wait/return/detach/attach | UNKNOWN |
| UNKNOWN | Wait | Any |
| UNKNOWN | Return | Any |
| UNKNOWN | Detach | Any |
| UNKNOWN | Attach | Any |

While all of these transitions are possible, they do not all lead toward a safe buffer state (ZERO) for redirecting a connection from a host socket to an overlay socket. Certain operations may therefore be blocked, depending on the present state of the connection, to encourage the connection to move toward a safe state. Note, each state 202 may include an action that refers back to the same state. For example, if the outgoing buffer already contains data, then an additional local write will not change the state of the system. These operations are omitted for the sake of visual clarity.

Figure 3:
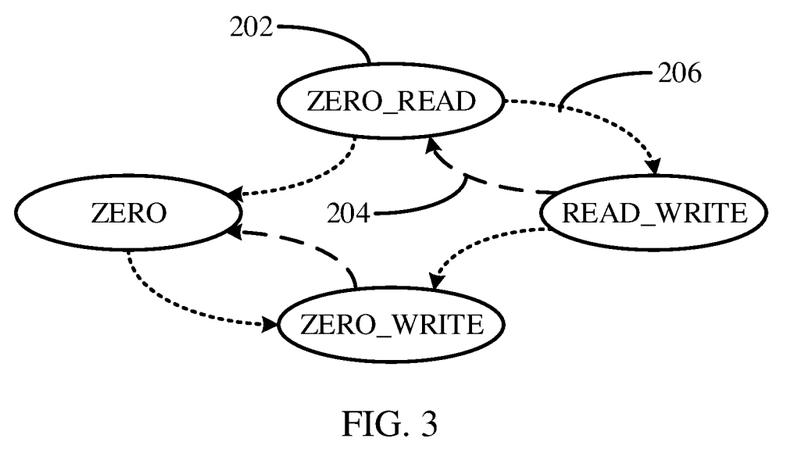
FIG. 3 is a state diagram that illustrates possible connection states and actions that can move the connection from one state to another, in accordance with an embodiment of the present invention.

Referring now to FIG. 3, a modified state diagram is shown. In particular, local write actions may be blocked. Then, if the incoming buffer is not empty (e.g., in the ZERO_WRITE or READ_WRITE state), the next call is executed, as such actions will lead back to the safe ZERO state. Remote write actions as still allowed—if the remote host writes to the local incoming buffer, that is not blocked. Table 2 below shows the operations that may occur according to these rules. The unknown state is omitted for the sake of visual clarity, but it should be understood that the unknown state is present when the state of the remote system cannot be determined.

TABLE 2

| Current state | Action | Destination state |
|---|---|---|
| ZERO | Remote write | ZERO_WRITE |
| ZERO_READ | Remote read | ZERO |
| ZERO_READ | Remote write | READ_WRITE |
| ZERO_WRITE | Local read | ZERO |
| READ_WRITE | Local read | ZERO_READ |
| READ_WRITE | Remote read | ZERO_WRITE |

Figure 4:
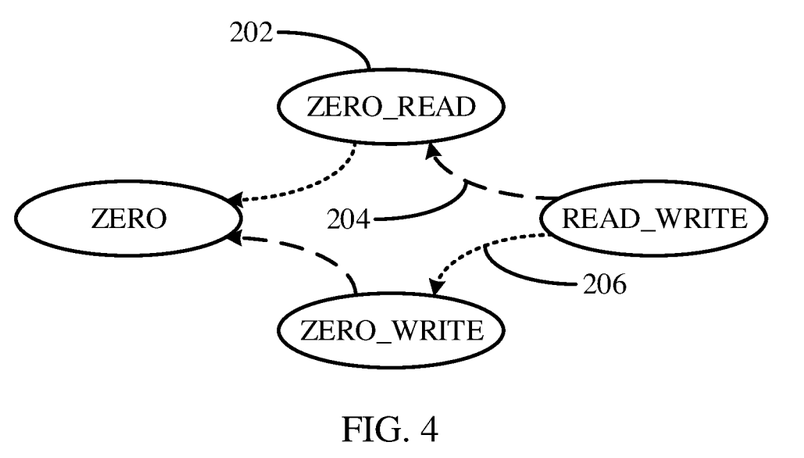
FIG. 4 is a state diagram that illustrates possible connection states and actions that can move the connection from one state to another, in accordance with an embodiment of the present invention.

Referring now to FIG. 4, a modified state diagram is shown. At this stage, the states between the local host 102 and the remote 102 are synchronized. Further rules are imposed to ensure that the remote host 102 can continue reading data that is in the local host's outgoing buffer. In this state, read and write calls may continue if the remote host is in an UNKNOWN state, a ZERO_READ state, or a READ_WRITE state. Table 3 shows the state transitions that may occur at this stage, all of which lead toward the safe ZERO state.

TABLE 3

| Current state | Action | Destination state |
|---|---|---|
| ZERO_READ | Remote read | ZERO |
| ZERO_WRITE | Local read | ZERO |

TABLE 3-continued

| Current state | Action | Destination state |
| --- | --- | --- |
| READ_WRITE | Local read | ZERO_READ |
| READ_WRITE | Remote read | ZERO_WRITE |

Figure 5:
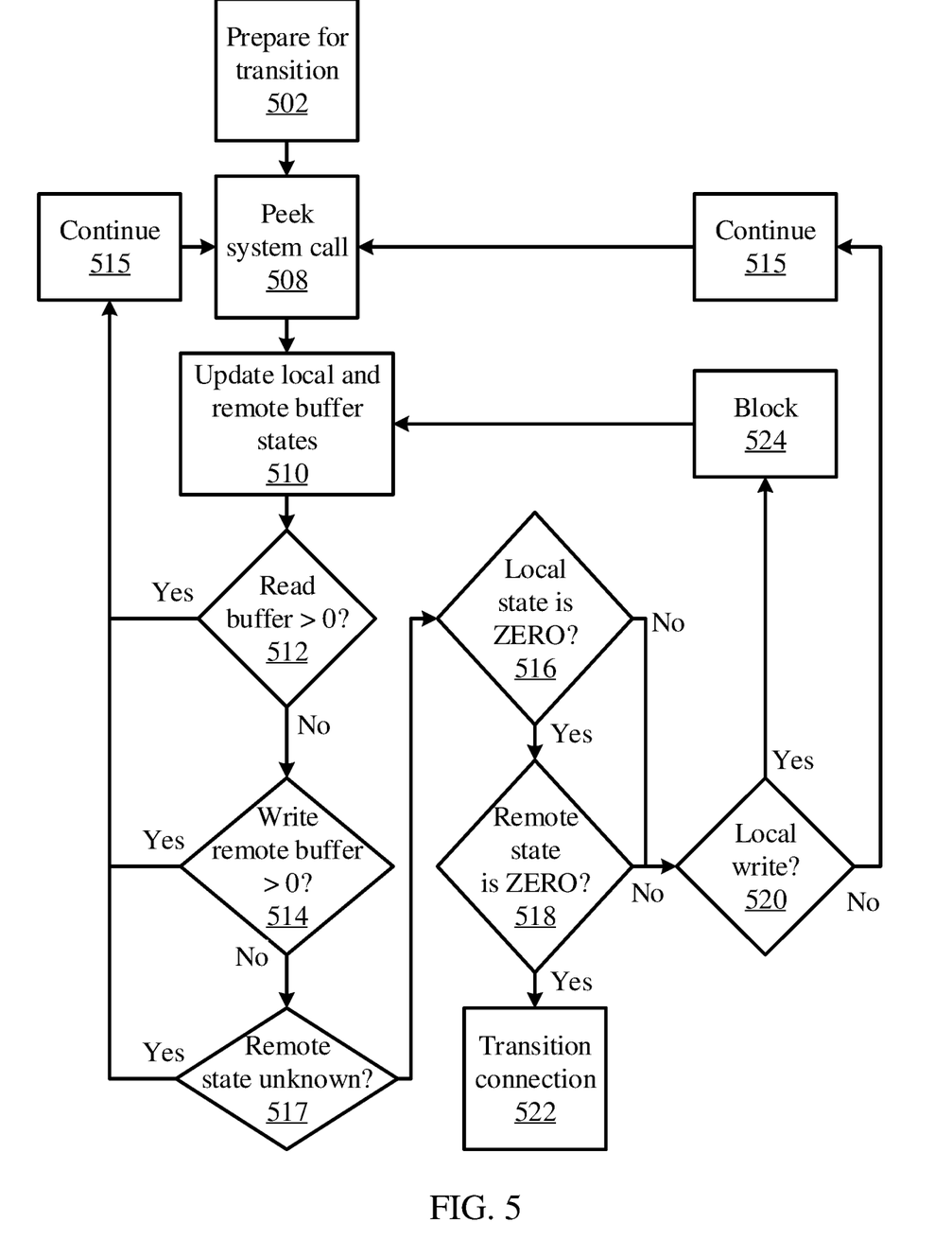
FIG. 5 is a block/flow diagram of a method of transitioning from one network type to another network type, in accordance with an embodiment of the present invention.

Referring now to FIG. 5, a method for performing live socket redirection is shown. Block 502 prepares to transition the connection from an overlay socket to a host socket at a local host 102. These initial steps may include the creation of a host socket to mirror the overlay socket for a target process and establishing a synchronization channel with the remote host 102 over, e.g., the physical networks 104 or an auxiliary network. A TCP_NODELAY option may be temporarily enabled so that data is transmitted as soon as it is available.

Block 508 obtains information about a system call, for example determining the nature of the call. In an example, such a call may be a local read or write call. Block 510 then updates the local and remote buffer states responsive to the call, as described with respect to the state diagrams above. The buffer states are updated before making a decision as to whether to continue or block the system call, because the decision needs to be based on the current local buffer state and the remote buffer state. The update determines those current states.

A series of state checks may now occur. Block 512 determines whether the local read buffer includes data. If so, then block 515 allows the call and a next call is selected. If not, then block 514 determines whether the remote write buffer includes data. If so, then block 515 allows the call and a next call is selected. If not, block 517 determines whether the state of the remote host is unknown. If so, then block 515 allows the call and a next call is selected. If any of these tests evaluates as true, then a next system call is considered in block 508.

If not, then block 516 determines whether the local state is ZERO and block 518 determines whether the remote state is ZERO, for example using the synchronization channel. If so, then block 522 transitions the connection from the overlay socket to the host socket. If either of the states is not ZERO, then block 520 determines whether the call is a local write. If so, then block 524 blocks the write and block 510 updates the local and remote buffer states. If not, then block 515 allows the call and block 508 gets system call information for a next call.

During operation, a call is performed only during continue block 515, after which processing halts again. When a call is blocked at block 524, the call is discarded before a new call is selected. While processing is halted, the current register may be read and overwritten. For example the current system call can be read out from the register in block 508 and a current buffer state can be determined in block 510 by injecting an ioctl command with TIOCOUTQ and FIONREAD flags, respectively.

Table 4 shows how a system call can be handled when the call is a write call. The rows indicate local states, while the columns indicate remote states. The remote ZERO_WRITE state can change to a remote ZERO state even when the remote side is blocked by a read call. The local ZERO_READ state can similarly change to a ZERO state when the process is blocked but the remote side continues to read from the buffer. The Continue actions in the remote READ_WRITE and remote ZERO_READ columns will allow either side of the connection to change to a ZERO or ZERO_WRITE state. The other side can block a write call and wait at ZERO or ZERO_READ state.

TABLE 4

| State | Remote ZERO | Remote ZERO_READ | Remote ZERO_WRITE | Remote READ_WRITE | Remote UNKNOWN |
| --- | --- | --- | --- | --- | --- |
| Local ZERO | Duplicate | Continue | Block | Continue | Continue |
| Local ZERO_READ | Block | Continue | Block | Continue | Continue |
| Local ZERO_WRITE | Continue | Continue | Continue | Continue | Continue |
| Local READ_WRITE | Continue | Continue | Continue | Continue | Continue |

Table 5 shows how a system call can be handled when the call is not a write call.

TABLE 5

| State | Remote ZERO | Remote ZERO_READ | Remote ZERO_WRITE | Remote READ_WRITE | Remote UNKNOWN |
| --- | --- | --- | --- | --- | --- |
| Local ZERO | Duplicate | Continue | Block | Continue | Continue |
| Local ZERO_READ | Continue | Continue | Continue | Continue | Continue |
| Local ZERO_WRITE | Continue | Continue | Continue | Continue | Continue |
| Local READ_WRITE | Continue | Continue | Continue | Continue | Continue |

Figure 6:
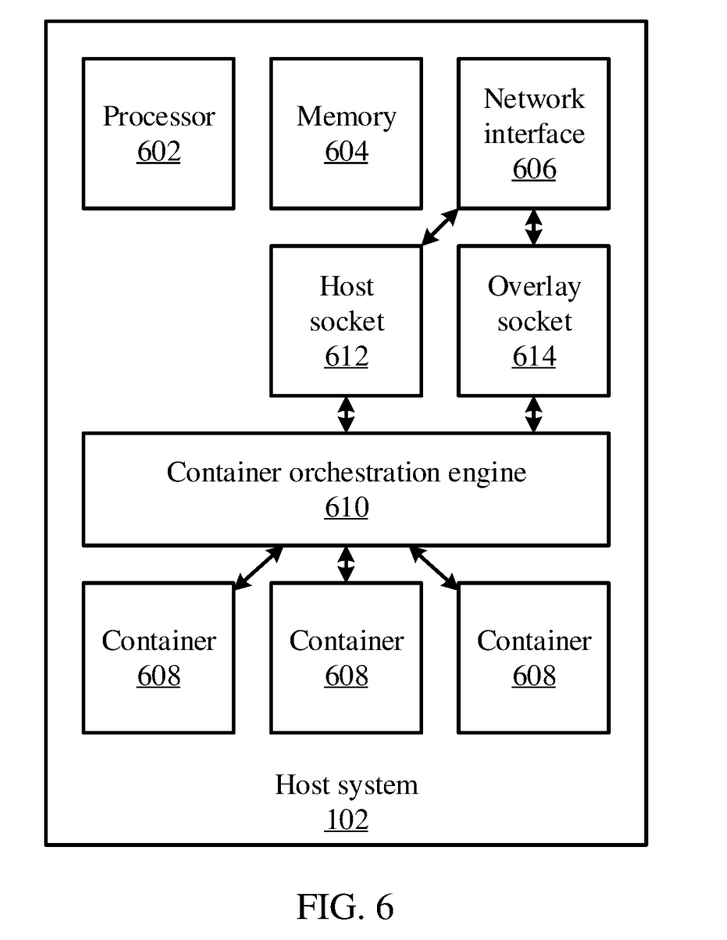
FIG. 6 is a block diagram of a host system in a distributed computing system that can communicate over an overlay network and over a host-level network and that can transition connections between networks, in accordance with an embodiment of the present invention.

Referring now to FIG. 6, additional detail on an exemplary host system 102 is shown. The processing node 102 includes a hardware processor 602, a memory 604, and a network interface 606. As described above, the network interface 606 may communicate with other hosts 102 over physical networks 104, using any appropriate communications medium and protocol. The host system 102 also includes one or more functional modules that may, in some embodiments, be implemented as software that is stored in the memory 604 and that is executed by the hardware processor 602. In other embodiments, one or more of the functional modules may be implemented as one or more discrete hardware components in the form of, e.g., application-specific integrated chips or field programmable gate arrays.

The host system 102 includes one or more containers 608. It is specifically contemplated that each container 608 represents a distinct operating environment. The containers 608 each include a set of software applications, configuration files, workload datasets, and any other information or software needed to execute a specific workload. The containers 608 are stored in memory 604 and are instantiated and decommissioned by the container orchestration engine as needed. It should be understood that, as a general matter, an operating system of the host system 102 exists outside the containers 608. Thus, each container 608 interfaces with the same operating system kernel, reducing the overhead needed to execute multiple containers simultaneously. The containers 608 meanwhile generally have no communication with one another outside of specifically agreed-to interfaces, reducing security concerns.

When a container 608 attempts to communicate over a network, whether over the physical network 104 or the overlay network 106, the orchestration engine translates its requests into communications which may be used by the network interface 606. In particular, a host socket 612 may be used to communicate via a host network, while an overlay socket 614 may be used to communicate via an overlay network 106.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
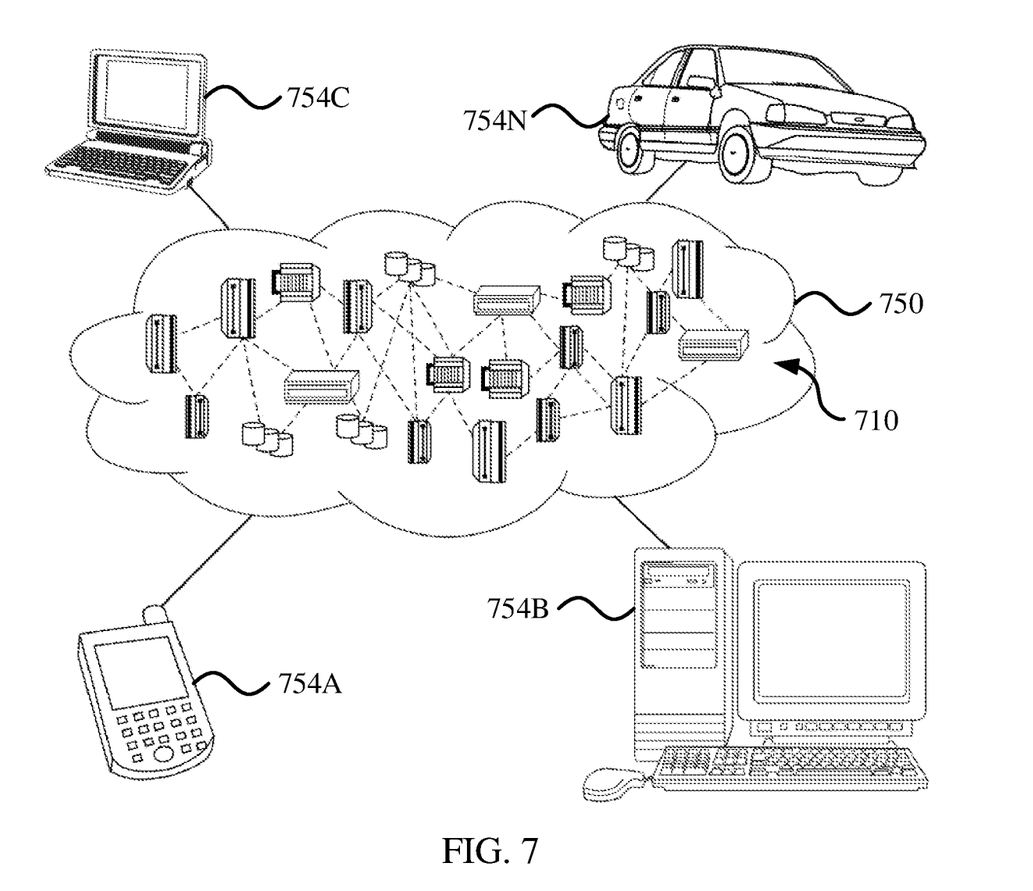
FIG. 7 is a block diagram showing an illustrative cloud computing environment having one or more cloud computing nodes with which local computing devices used by cloud consumers communicate in accordance with one embodiment.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
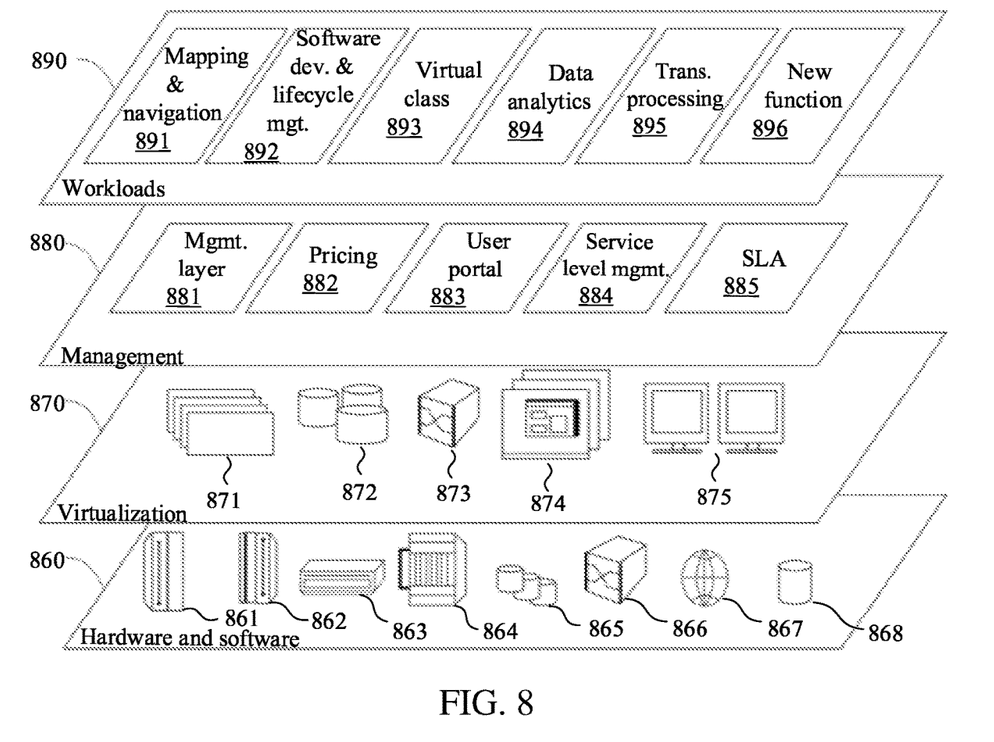
FIG. 8 is a block diagram showing a set of functional abstraction layers provided by a cloud computing environment in accordance with one embodiment.

Referring now to FIG. 8, a set of functional abstraction layers provided by cloud computing environment 850 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and overlay networking 896.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of live socket redirection (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A networking method, comprising:
    determining a first state of a connection on a first network based on connection buffers at a host;
    identifying a first system call relating to the connection;
    determining a next state of the connection that would result from the first system call;
    executing the first system call responsive to a determination that the next state does not move the connection farther from a safe transition state;
    determining that the next state is a safe transition state; and
    transitioning the connection from the first network to a second network.

2. The networking method of claim 1, wherein the first network is an overlay network and the second network is a host-level network.

3. The networking method of claim 1, wherein transitioning the connection includes duplicating a file descriptor.

4. The networking method of claim 1, wherein the safe transition state is a state where an incoming connection buffer and an outgoing connection buffer at a host are both empty.

5. The networking method of claim 1, wherein the first system call is a local read operation that reads from an incoming connection buffer at the host.

6. The networking method of claim 1, further comprising synchronizing connection states with a remote host.

7. The networking method of claim 6, wherein synchronizing connection states includes communicating state information between the host and the remote host.

8. The networking method of claim 1, further comprising identifying a second system call relating to the connection, including a local write operation that writes to an outgoing connection buffer at the host.

9. The networking method of claim 8, further comprising blocking the second system call from execution.

10. A computer program product for networking, the computer program product comprising a computer readable storage medium having program instructions embodied therewith, the program instructions being executable by a hardware processor to cause the hardware processor to:
    determine a first state of a connection on a first network based on connection buffers at a host;
    identify a first system call relating to the connection;
    determine a next state of the connection that would result from the first system call;
    execute the first system call responsive to a determination that the next state does not move the connection farther from a safe transition state;
    determine that the next state is a safe transition state; and
    transition the connection from the first network to a second network.

11. A networking system, comprising:
    a hardware processor; and
    a memory that stores a computer program, which, when executed by the hardware processor, causes the hardware processor to:
        determine a first state of a connection on a first network based on connection buffers at a host;
        identify a first system call relating to the connection;
        determine a next state of the connection that would result from the first system call;
        execute the first system call responsive to a determination that the next state does not move the connection farther from a safe transition state;
        determine that the next state is a safe transition state; and
        transition the connection from the first network to the second network.

12. The networking system of claim 11, wherein the first network is an overlay network and the second network is a host-level network.

13. The networking system of claim 11, wherein the hardware processor transitions the connection by duplicating a file descriptor.

14. The networking system of claim 11, wherein the safe transition state is a state where an incoming connection buffer and an outgoing connection buffer at a host are both empty.

15. The networking system of claim 11, wherein the first system call is a local read operation that reads from an incoming connection buffer at the host.

16. The networking system of claim 11, wherein the computer program further causes the hardware processor to synchronize connection states with a remote host.

17. The networking system of claim 16, wherein the hardware processor communicates state information between the host and the remote host for synchronization.

18. The networking system of claim 11, wherein the computer program further causes the hardware processor to:
    identify a second system call relating to the connection, including a local write operation that writes to an outgoing connection buffer at the host; and
    block the second system call from execution.

* * * * *